(12) United States Patent
Tregnago et al.

(10) Patent No.: US 8,342,757 B2
(45) Date of Patent: Jan. 1, 2013

(54) REAR-VIEW CAMERA UNIT FOR MOTOR-VEHICLES

(75) Inventors: Roberto Tregnago, Orbassano (IT); Nevio Di Giusto, Orbassano (IT); Francesca Cogotti, Orbassano (IT)

(73) Assignee: C.R.F. Società Consortile per Azioni, Orbassano (Torino) (IT)

(*) Notice: Subject to any disclaimer, the term of this patent is extended or adjusted under 35 U.S.C. 154(b) by 62 days.

(21) Appl. No.: 13/190,948

(22) Filed: Jul. 26, 2011

(65) Prior Publication Data

US 2012/0070142 A1 Mar. 22, 2012

(30) Foreign Application Priority Data

Sep. 20, 2010 (EP) .................................. 10425306

(51) Int. Cl.
*G03B 17/00* (2006.01)
(52) U.S. Cl. ........................ 396/419; 348/148
(58) Field of Classification Search .............. 396/12, 396/13, 419, 427; 348/148
See application file for complete search history.

(56) References Cited

U.S. PATENT DOCUMENTS

| 6,259,475 | B1* | 7/2001 | Ramachandran et al. .... 348/148 |
| 2005/0014445 | A1* | 1/2005 | Fasquel et al. ............... 446/232 |
| 2008/0158352 | A1* | 7/2008 | Schmidt et al. ............... 348/118 |
| 2011/0041474 | A1* | 2/2011 | Gerez et al. ..................... 60/223 |
| 2011/0292212 | A1* | 12/2011 | Tanabe et al. ................. 348/148 |
| 2012/0105638 | A1* | 5/2012 | Englander ..................... 348/148 |

FOREIGN PATENT DOCUMENTS

JP 2005059661 A 3/2005

OTHER PUBLICATIONS

European Search Report for corresponding priority application No. EP10425306.7, dated Mar. 4, 2011, and completed on Feb. 28, 2011.

* cited by examiner

*Primary Examiner* — Clayton E Laballe
*Assistant Examiner* — Warren K Fenwick
(74) *Attorney, Agent, or Firm* — Heslin Rothenberg Farley & Mesiti P.C.; Victor A. Cardona, Esq.

(57) ABSTRACT

An external rear-view camera unit for motor vehicles includes a camera and a support for such camera prearranged to be connected to a structure of a motor vehicle. The support includes at least one wing element, with a wing profile, having an end for connection to the structure of the motor vehicle and an opposite end portion bearing the body of the camera and ending with a winglet portion. A lower wing element and an upper wing element may be parallel and spaced from each other. The portion for supporting the body of the camera is in the form of a casing surrounding the body of said camera and having passages for conveying the air—that impacts said unit during the travel of the motor vehicle—around the body of said camera and at the front of the transparent element for protecting the camera lens.

20 Claims, 2 Drawing Sheets

REAR-VIEW CAMERA UNIT FOR MOTOR-VEHICLES

REFERENCE TO RELATED APPLICATIONS

This application claims priority from European Patent Application No. 10425306.7 filed on Sep. 20, 2010, the entire disclosure of which is incorporated herein by reference.

BACKGROUND OF THE INVENTION

The present invention regards an external rear-view camera unit for motor vehicles, for example for trucks, of the type indicated in the preamble of claim 1. A unit of this type is disclosed in U.S. 2008/158352 A1.

The present invention has the aim of providing a camera unit of the above indicated type having a very low aerodynamic resistance and also an extremely low aerodynamic noise and which also guarantees a self-cleaning and anti-condensation effect on the transparent element for protecting the camera lens, even in case of rain.

With the aim of attaining such object, the invention provides an external rear-view camera unit for motor vehicles having the characteristics indicated in claim 1.

The provision of a support in form of a wing element, with a wing profile, allows a substantial reduction of the aerodynamic resistance of the unit according to the invention. A further advantageous effect as regards with the reduction of the aerodynamic resistance derives from the prearrangement of the abovementioned winglet, which prevents the formation of vortices at the end of the wing element, with advantages also in terms of noiselessness.

Simultaneously, the provision of passages which convey the air around the body of the camera and at the front of the transparent element of the camera allows obtaining a self-cleaning effect for such transparent element.

The invention has the further advantage lying in that the air that reaches above the transparent element for protecting the camera lens is first heated by the relatively hot body of the camera, hence allowing eliminating or at least reducing the water that is drawn into the airflow in case of rain, and prevent the formation of condensate on the transparent element. In a preferred embodiment said casing surrounding the body of the camera advantageously has even one or more passages for discharging water.

In the abovementioned preferred embodiment of the invention, the support comprises a lower wing element and an upper wing element, parallel and spaced from each other.

Furthermore, preferably, each of said wing elements has a twisted configuration, wherein the abovementioned wing profile defined by the transverse section of the wing element is progressively rotated along the longitudinal extension of the wing element, at least over a portion thereof. Such solution allows preventing or at least reducing the formation of vortices in adjacency to the surfaces of the wing element, with the ensuing reduction of the aerodynamic resistance and noise.

In a concrete embodiment, the abovementioned winglet is made up of an extension of the lower wing element and the portion for supporting the camera is connected to said upper wing element.

In a variant, both wing elements have ends turned upwards defining respective winglets and the portion for supporting the camera is interposed between said wings.

According to a further preferred characteristic, the casing defined by the abovementioned portion for supporting the camera is configured similar to a nacelle of a turboreactor, with a jacket surrounding the body of the camera and a front wall and a rear wall in which the abovementioned passages for conveying air are defined. In addition, one or more passages for draining the water are formed in the lower part of the jacket.

BRIEF DESCRIPTION OF THE DRAWINGS

Further characteristics and advantages of the invention shall be clear from the description that follows with reference to the attached drawings, provided purely by way of non-limiting example, wherein.

DETAILED DESCRIPTION OF THE INVENTION

Figure 1:
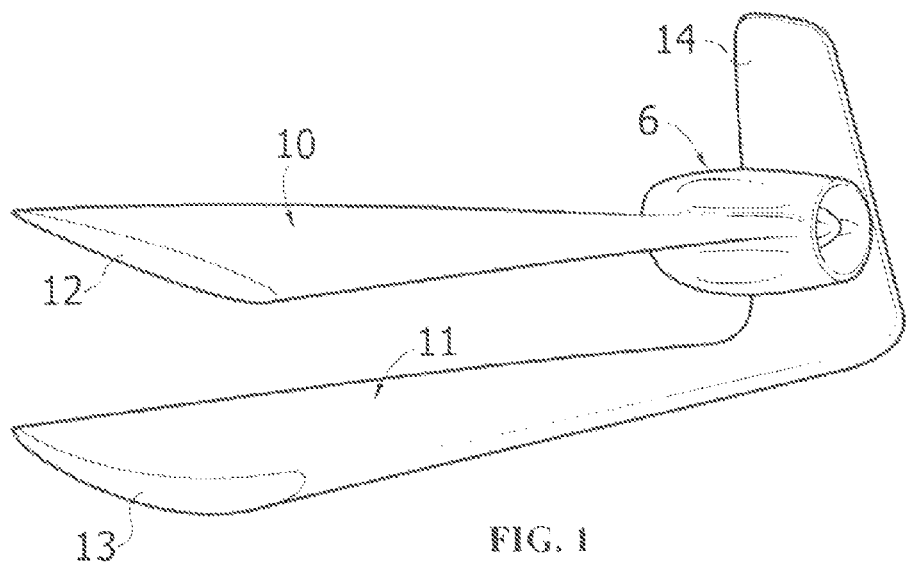
FIGS. 1-3 are a perspective view, front view, and bottom view of a preferred embodiment of the external rear-view camera unit according to the invention.

Referring to FIGS. 1-4, a preferred embodiment of the unit according to the invention, which in this specific case was developed with reference to an application to a truck, is indicated in its entirety with 1. The unit 1 comprises a camera 2 of any known type, having a body 3 with a lens (not shown in the drawings) protected by a transparent element 4.

The body 3 of the camera is mounted in a casing, which serves as a portion for supporting the camera and which—in the illustrated example—is configured similar to a nacelle of a turboreactor, with a cylindrical jacket 6a, slightly rounded surrounding the body 3 of the camera, an end wall 6b (which is a front wall with reference to the direction of motion of the motor vehicle) and an opposite rear wall 6c. The front wall 6b has an ogive central portion. Obviously the specific configuration of the casing 6 illustrated herein is indicated purely by way of example, given that it is clear that such configuration may widely vary, depending on the design requirements.

Figure 4:
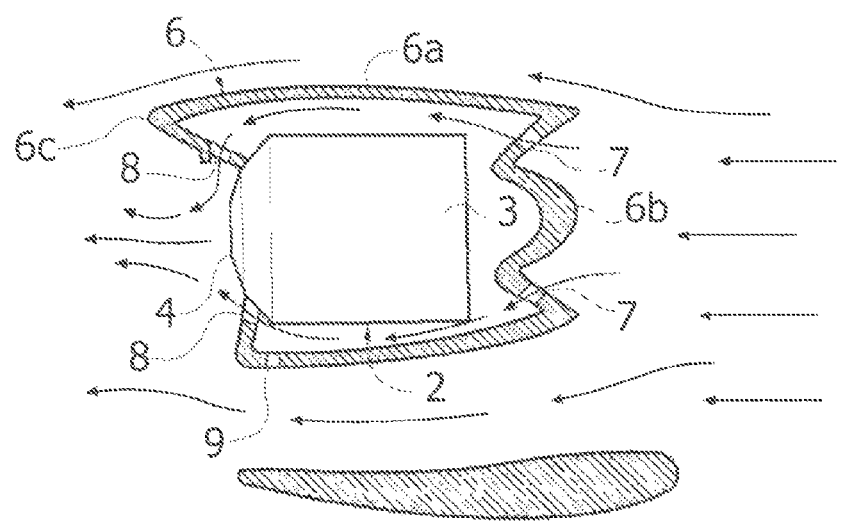
FIG. 4 is a sectional view according to line IV-IV of FIG. 2.

Both walls 6b, 6c have passages 7, 8 (FIG. 4) which convey the airflow F—which impacts the unit 1 during the travel of the motor vehicle within the casing 6—around the body 3 of the camera 2 and then at the front of the transparent element 4. As illustrated in FIG. 4 for the passage 8 arranged above the element 4, such passages may be provided with guide lips, for diverting the airflow against the transparent element 4.

This allows obtaining a self-cleaning effect for the transparent element 4, with the further advantage that the airflow that reaches the transparent element 4 is first heated by the relatively hot body of the camera, hence eliminating or reducing the formation of condensate on the transparent element, particularly in case of rain.

The jacket 6a has—at the lower part—one or more openings 9, for discharging water.

As clearly observable in FIG. 1, the camera unit support comprises an upper wing element 10, and a lower wing element 11, both having a transverse section in forma of a wing profile, designed to minimize the aerodynamic resistance and the aerodynamic noise of the unit to the maximum. The wing elements 10, 11 have ends 12, 13 intended to be connected to the structure of the motor vehicle, outside the latter, adjacent to a side window. The means for connecting to the structure of the motor vehicle are neither described nor illustrated herein, in that they may be obtained in any known manner. For example, both ends 12, 13 may be connected to a common support base which is fixed—using screw connection means—to the structure of the motor vehicle. Analogously, the details regarding the electric connection of the camera to the electric power supply circuit and to the electronic control unit of the motor vehicle were not illustrated, in that they may be obtained in any known manner. Advantageously, the wires for such connections may be arranged inside the structure of one or both wing elements 10, 11.

According to a further important characteristic of the invention, each of the wing elements 10, 11 has a twisted configuration, with the transverse wing profile thereof rotated progressively along the longitudinal extension of the wing element, at least over a portion thereof. Such twisting allows reducing the effects of formation of aerodynamic vortices in adjacency to the surface of the wing elements, with the ensuing reduction of the aerodynamic resistance and noise.

Still with the aim of reducing the aerodynamic resistance and noise, a winglet—substantially perpendicular to the two wing elements 10, 11, having the function of preventing the formation of aerodynamic vortices in adjacency to the ends of the wing elements 10, 11, with the ensuing reduction of aerodynamic resistance and noise—is provided for at the end of the two wing elements 10, 11 opposite to that of connecting to the structure of the motor vehicle, adjacent to the support nacelle 6.

In the case of the illustrated example, the winglet 14 is defined by an extension of the lower wing element 11, which is turned upwards and continues above the upper wing element 10 and the support nacelle 6.

Figure 2:
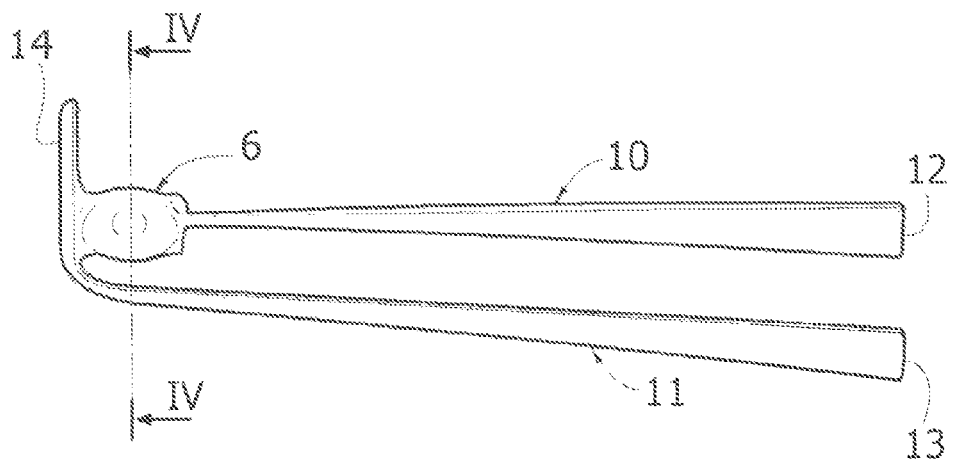
Figure 3:
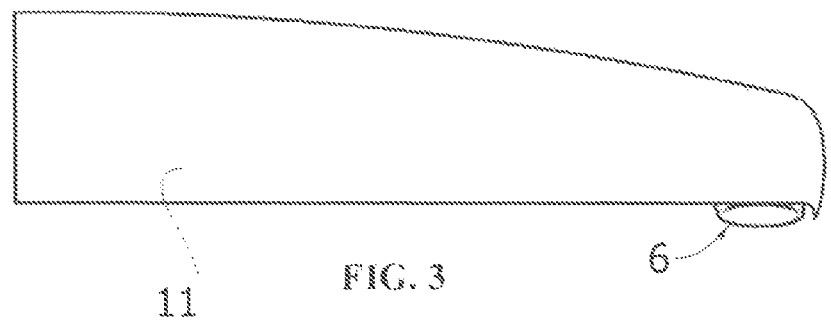
Figure 5:
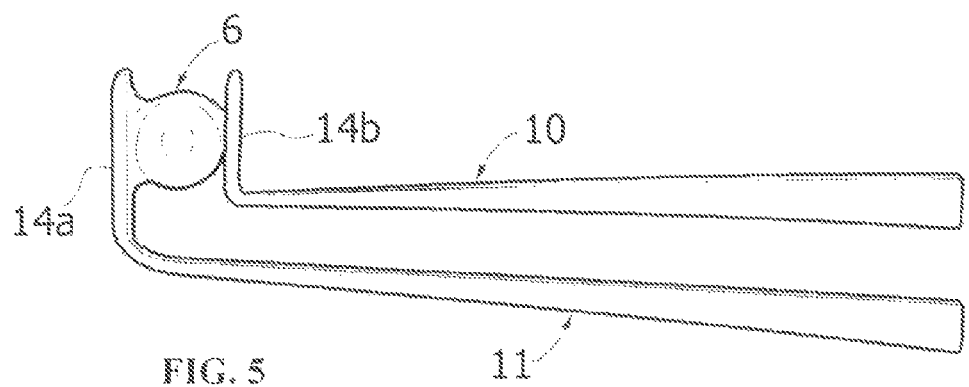
FIG. 5 illustrates a variant of FIG. 2 with reference to a second embodiment.

FIG. 5 illustrates a variant of FIG. 2, wherein both wing elements 10, 11 have ends turned upwards, so as to define two winglets 14a, 14b, between which a camera 2 is interposed.

As clear from the description above, the invention allows reducing the aerodynamic resistance and noise of the camera support to the minimum, also guaranteeing a self-cleaning effect of the transparent front element of the camera, even in case of rain. At the same time, the configuration of the device according to the invention which allows obtaining the advantages indicated above also leads to an entirely original aesthetic result which contributes to the improvement of the quality of the motor vehicle in its entirety.

Obviously, without prejudice to the principle of the invention, the construction details and the embodiments may widely vary with respect to what has been described and illustrated purely by way of example, without departing from the scope of protection of the present invention.

What is claimed is:

1. An external rear-view camera unit for motor vehicles, comprising:
   a camera, having a camera body and including a transparent element for protecting the camera lens, and a support for said camera, adapted to be connected to a structure of a motor vehicle,
   wherein said support comprises a casing surrounding the body of said camera and having passages for conveying the air that impacts said unit during the travel of the motor vehicle, the passages conveying the air around the body of said camera and at the front of the transparent element for protecting the camera lens,
   said support comprising at least one wing element, with a wing profile, having one end for connection to the structure of the motor vehicle and an opposite end portion bearing the body of said camera, defining said casing and ending with a winglet portion, extending upwards, suitable to prevent the formation of air vortices at the end of said wing element, and said end portion bearing the camera.

2. External rear-view camera unit according to claim 1, wherein the casing defined by said portion for supporting the camera has one or more openings for discharging water.

3. External rear-view camera unit according to claim 1, wherein the casing defined by said portion for supporting the camera is configured similar to a nacelle of a turboreactor, with a jacket surrounding the body of the camera and a front wall and a rear wall in which the abovementioned passages for conveying air are defined.

4. External rear-view camera unit according to claim 1, wherein the support comprises a lower wing element and an upper wing element, parallel and spaced from each other.

5. External rear-view camera unit according to claim 4, wherein each of said wing elements has a twisted configuration, wherein the abovementioned wing profile defined by the transverse section of the wing element is progressively rotated along the longitudinal extension of the wing element, at least over a portion thereof.

6. External rear-view camera unit according to claim 5, wherein the casing defined by said portion for supporting the camera has one or more openings for discharging water.

7. External rear-view camera unit according to claim 5, wherein the casing defined by said portion for supporting the camera is configured similar to a nacelle of a turboreactor, with a jacket surrounding the body of the camera and a front wall and a rear wall in which the abovementioned passages for conveying air are defined.

8. External rear-view camera unit according to claim 4, wherein said winglet is made up of an extension of the lower wing element.

9. External rear-view camera unit according to claim 8, wherein said portion for supporting the camera is connected to said upper wing element.

10. External rear-view camera unit according to claim 9, wherein the casing defined by said portion for supporting the camera has one or more openings for discharging water.

11. External rear-view camera unit according to claim 9, wherein the casing defined by said portion for supporting the camera is configured similar to a nacelle of a turboreactor, with a jacket surrounding the body of the camera and a front wall and a rear wall in which the abovementioned passages for conveying air are defined.

12. External rear-view camera unit according to claim 8, wherein the casing defined by said portion for supporting the camera has one or more openings for discharging water.

13. External rear-view camera unit according to claim 8, wherein the casing defined by said portion for supporting the camera is configured similar to a nacelle of a turboreactor, with a jacket surrounding the body of the camera and a front wall and a rear wall in which the abovementioned passages for conveying air are defined.

14. External rear-view camera unit according to claim 4, wherein both wing elements have the ends turned upwards defining respective winglets.

15. External rear-view camera unit according to claim 14, wherein the portion for supporting the camera is interposed between said wings.

16. External rear-view camera unit according to claim 15, wherein the casing defined by said portion for supporting the camera has one or more openings for discharging water.

17. External rear-view camera unit according to claim 14, wherein the casing defined by said portion for supporting the camera has one or more openings for discharging water.

18. External rear-view camera unit according to claim 14, wherein the casing defined by said portion for supporting the camera is configured similar to a nacelle of a turboreactor, with a jacket surrounding the body of the camera and a front wall and a rear wall in which the abovementioned passages for conveying air are defined.

19. External rear-view camera unit according to claim 4, wherein the casing defined by said portion for supporting the camera has one or more openings for discharging water.

20. External rear-view camera unit according to claim 4, wherein the casing defined by said portion for supporting the camera is configured similar to a nacelle of a turboreactor, with a jacket surrounding the body of the camera and a front wall and a rear wall in which the abovementioned passages for conveying air are defined.

* * * * *